(12) United States Patent
Lee

(10) Patent No.: US 7,562,526 B2
(45) Date of Patent: Jul. 21, 2009

(54) WAVE POWER GENERATING DEVICE

(76) Inventor: Wang Lee, 6/F, 14 Lun Cheung Street, To Kwa Wan, Kowloon, Hong Kong (CN)

( * ) Notice: Subject to any disclaimer, the term of this patent is extended or adjusted under 35 U.S.C. 154(b) by 202 days.

(21) Appl. No.: 11/854,675

(22) Filed: Sep. 13, 2007

(65) Prior Publication Data

US 2008/0084069 A1 Apr. 10, 2008

(30) Foreign Application Priority Data

Oct. 8, 2006 (CN) .................... 2006 2 0135572

(51) Int. Cl.
*F03C 1/00* (2006.01)
(52) U.S. Cl. .............................. 60/507; 60/497; 290/42; 290/53
(58) Field of Classification Search ........... 60/495–497, 60/507; 290/42, 53
See application file for complete search history.

(56) References Cited

U.S. PATENT DOCUMENTS

| | | | | | |
|---|---|---|---|---|---|
| 1,376,140 A | * | 4/1921 | Ervin | ........................ | 60/507 |
| 1,403,702 A | * | 1/1922 | Melvin | ........................ | 60/496 |
| 1,485,574 A | * | 3/1924 | Viora | ........................ | 60/506 |
| 1,816,044 A | * | 7/1931 | Gallagher | ..................... | 60/506 |
| 2,023,821 A | * | 12/1935 | Purnasiri | ..................... | 60/503 |
| 4,249,639 A | * | 2/1981 | Vukovic | ..................... | 185/30 |
| 4,319,454 A | * | 3/1982 | Lucia | ........................ | 60/506 |

\* cited by examiner

*Primary Examiner*—Hoang M Nguyen
(74) *Attorney, Agent, or Firm*—Global IP Services; Tianhua Gu

(57) ABSTRACT

This invention relates to a wave power generating device, comprising a lifting pillar installed on a floating platform, a sleeve covered outside said lifting pillar and two groups of ratchet wheel mechanisms installed on said sleeve; wherein the inner wheel of each of said ratchet wheel mechanisms rotates with the sleeve, the outer wheel of each of said ratchet wheel mechanisms drives a corresponding power generator to generate power; and the first outer wheel in the first group of ratchet wheel mechanism rotates with a first inner wheel along the first direction when the lifting pillar is rising, while the second outer wheel in the second group of ratchet wheel mechanism rotates with the second inner wheel along the second direction when the lifting pillar is falling. The wave power generating device of the invention has advantages of simple structure, low loss, and high power efficiency, and may transport much power energy for various uses.

10 Claims, 6 Drawing Sheets

WAVE POWER GENERATING DEVICE

CROSS REFERENCE TO THE RELATED PATENT APPLICATION

This application claims the priority of the Chinese patent application No. 200620135572.1 with filing date of Oct. 8, 2006.

FIELD OF THE INVENTION

This invention relates to a power generating device, more particularly, relates to a power generating device using up and down of ocean waves.

BACKGROUND OF THE INVENTION

Using up and down of ocean waves to generate power, is a newly researched energy, which is not only environment friendly but also always available for use. Presently, there have been many designs and plans using ocean waves to generate power, such as Chinese Patent Application with Publication No. CN1080692A, disclosing a wave power generating device, providing a stay rod attached to a concrete anchor block sinking to the seabed (epicontinental sea), or installing the stay rod on a stable plate kept in a certain depth under water (deep sea place), wherein the stay rod passes through a hole of a floating plate, thus the toothed rack (or frictional strip) on the stay rod is engaged (or contacted) with the input gear (or friction gear) of the rotating transmission device on the floating plate where the rotating transmission device converts a bidirectional movement to an unidirectional movement; up-and-down movements of the ocean waves make the floating plate reciprocating along the stay rod, in such way, converting the reciprocating motion of the toothed rack into rotation motion of the gear, which is then converted into a unidirectional rotation motion utilized to drive a generator to generate power. This wave power generating device has complex structure, big loss, low efficiency, and not available for multiple uses.

BRIEF SUMMARY OF THE INVENTION

This invention provides a wave power generating device with simple structure and high power efficiency, to solve the insufficiency existing in the existing technology.

According to an aspect of the invention, a wave power generating device is provided, comprises a lifting pillar installed on a floating platform, a sleeve covered outside said lifting pillar, a first and second ratchet wheel mechanisms installed on said sleeve; wherein a external circumference of said lifting pillar is engaged with a inner circumference of said sleeve via screw threads, thereby said sleeve rotates along a first direction or a second direction with the rises and falls of the lifting pillar; the first or second ratchet wheel mechanisms comprises an inner wheel with multiple pawls and an outer wheel with corresponding multiple ratchets on its inner circumference, the inner wheel of the first or second ratchet wheel mechanisms is fixed on said sleeve and rotates with the sleeve, the outer wheel of the first or second ratchet wheel mechanisms drives a corresponding power generator to generate power; the pawls and the ratchets of the first ratchet wheel mechanisms are engaged with each other to make the outer wheel and inner wheel of the first ratchet wheel mechanism rotating together along the first direction when the lifting pillar is rising, the pawls and the ratchets of the second ratchet wheel mechanisms are engaged with each other to make the outer wheel and inner wheel of the second ratchet wheel mechanism rotating along the second direction when the lifting pillar is falling.

Advantageously, three traction gears are installed on the second outer wheel of said second ratchet wheel mechanism, engaged with a corresponding annular rack rail provided on the first outer wheel of said first ratchet wheel mechanism.

Advantageously, each of said traction gears is perpendicular to the second outer wheel, and positioned inside a corresponding through groove on the second outer wheel by a pin shaft, engaged with the annular rack rail on said first outer wheel.

Advantageously, the first outer wheel of said first ratchet wheel mechanism is supported by a rolling bearing with a #-shaped bracket attached on the sleeve, and the second outer wheel of said second ratchet wheel mechanism is supported on the first outer wheel by the traction gears.

Advantageously, the first outer wheel of said first ratchet wheel mechanism and the second outer wheel of the second ratchet wheel mechanism are respectively equipped with two or more centrifugal hammers along a radial direction on their external circumferences.

Advantageously, the screw threads on the external circumference of said lifting pillar is formed by an I-shaped steel rail wound regularly around the lifting pillar, and a corresponding spiral groove for receiving the steel rail is provided on the inner circumference of said sleeve.

Advantageously, said first or second inner wheel includes 8 pawls matching with the corresponding ratchets on the first or second outer wheel.

Advantageously, said first or second inner wheel includes 4 pawls matching with the corresponding ratchets on the first or second outer wheel.

Advantageously, each of said pawls includes a spring fixed on the first or second inner wheel and a lock core in the spring.

Advantageously, a wind power generator is attached on a bracket of said floating platform.

The wave power generating device in accordance with the present invention has advantages of simple structure, low loss, and high power efficiency, and the wave power generating device may transport much power energy for various uses.

BRIEF DESCRIPTION OF THE DRAWINGS

Further explanation to the invention can be found in the following description in conjunction with the drawings, in which.

DETAILED DESCRIPTION OF THE INVENTION

Figure 1:
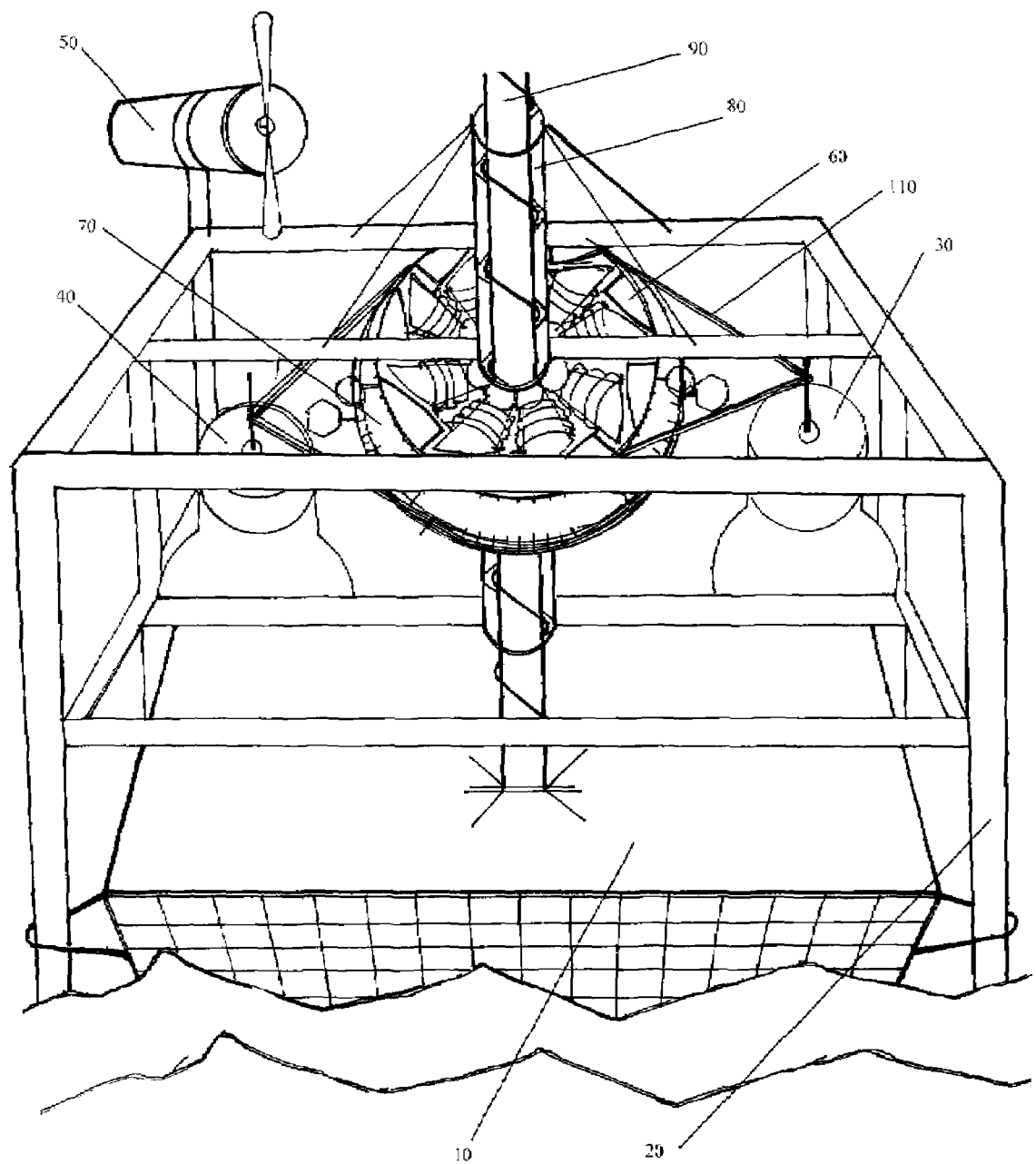
FIG. 1 is an overall structure schematic diagram of the wave power generating device in accordance with an embodiment of the invention.

As shown in FIG. 1, the wave power generating device in accordance with the invention is installed on a floating platform 10 over the sea. The floating platform 10 is positioned inside the bracket 20 fixed on the seabed. A lifting pillar 90 is fixed on the floating platform 10, which may rise and fall with the floating platform. The lifting pillar 90 is covered with a sleeve 80 on its outside, and engaged with each other via screw threads, thus during the rises and falls process of the lifting pillar 90, the sleeve 80 is driven by the screw threads to rotate counterclockwise or clockwise. The sleeve 80 equips with two ratchet wheel mechanisms rotating oppositely relative to each other, that is, a first ratchet wheel mechanism 70 on the downside and a second ratchet wheel mechanism 60 on the upside. Each ratchet wheel mechanism 60 or 70 comprises an inner wheel with a plurality of pawls and an outer wheel with a plurality of corresponding ratchets on its inner circumference, the specific structure of which will be explained hereafter. As shown in Figures, the first outer wheel 71 of the first ratchet wheel mechanism 70 drives a first generator 40 to generate power through a belt 110, and the second outer wheel 61 of the second ratchet wheel mechanism 60 drives a second generator 30 to generate power through a belt 110. Besides, in order to increase the generating power, one or more wind power generator is further installed in the four corners of the bracket 20 for supplement.

Figure 2:
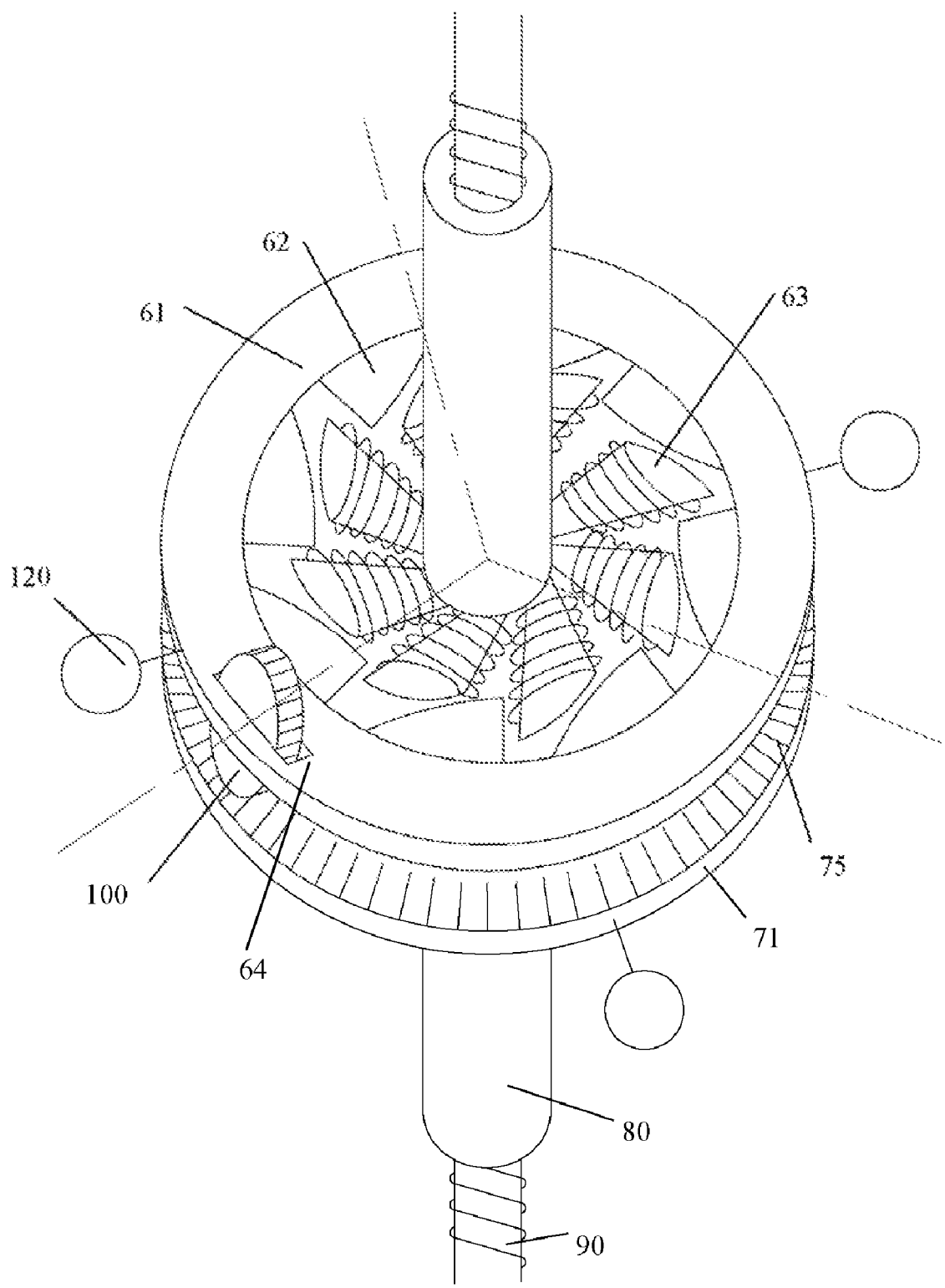
FIG. 2 is a schematic diagram of the transmission portion of the wave power generating device in accordance with an embodiment of the invention.
Figure 3:
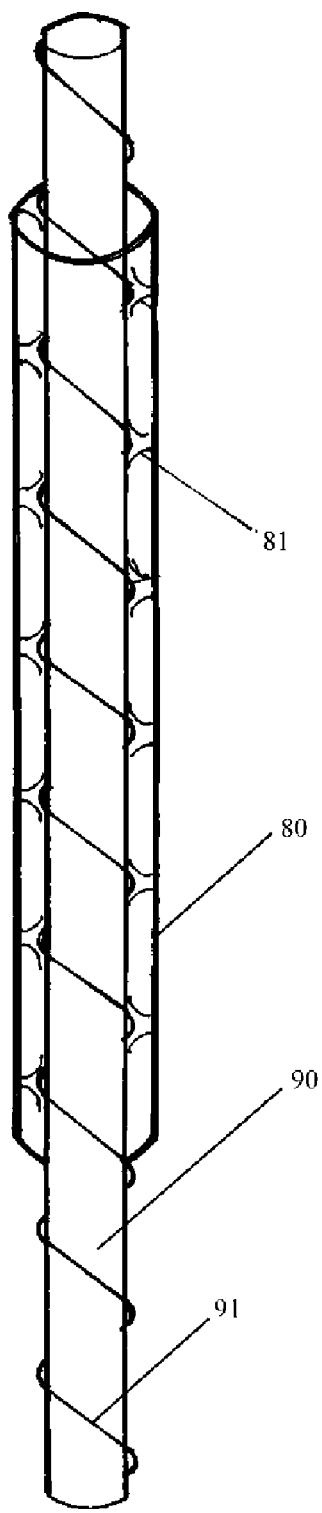
FIG. 3 is a schematic diagram illustrating engagement between the lifting pillar and the sleeve of the wave power generating device in accordance with an embodiment of the invention.

Specific structure of the transmission portion of the wave generating power device in accordance with the invention is shown in FIG. 2 and FIG. 3. As shown in FIG. 3, an I-shaped steel rail 91 is wound counterclockwise about the external circumference of the lifting pillar 90 in a regular interval to form the spiral threads. Correspondingly, the inner circumference of the said sleeve 80 is provided with a spiral groove 81 for receiving the steel rail. Thread engagement between the lifting pillar 90 and the sleeve 80 could be achieved by such structure. When the floating platform 10 rises under the action of ocean waves, the lifting pillar 90 rises, and in turn the sleeve 80 rotates counterclockwise (viewing from below) driven by the thread rotation; vice versa, when the floating platform falls under the action of ocean waves, the lifting pillar 90 falls, and in turn the sleeve 80 rotates clockwise. Obviously, the rotation direction of the sleeve 80 with respect to the rises and falls of the lifting pillar 90 may be changed by changing the rotation direction of the thread on the lifting pillar 90.

Figure 5:
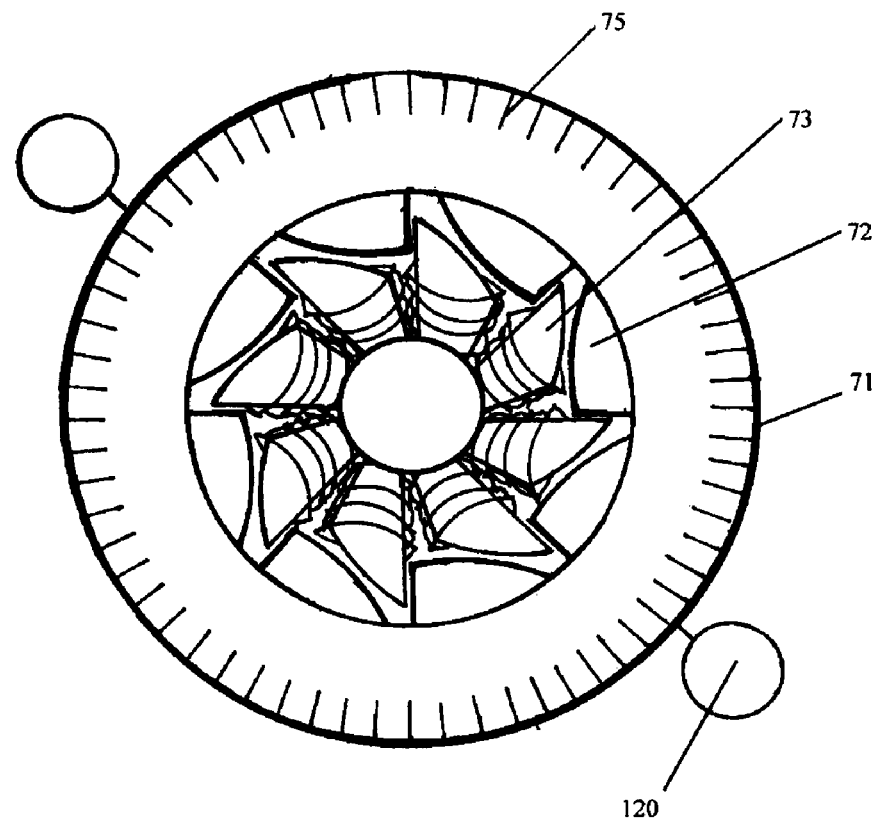
FIG. 5 is a schematic diagram of the first group of ratchet wheel mechanism of the wave power generating device in accordance with one embodiment of the invention.
Figure 7:
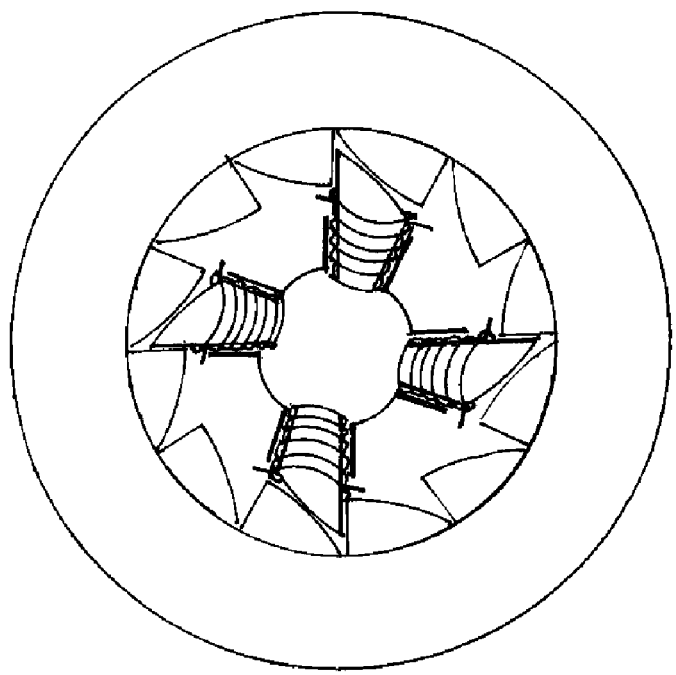
FIG. 7 is a schematic diagram illustrating engagement between the pawls and the ratchets of the first group of ratchet wheel mechanism in accordance with another embodiment of the invention.
Figure 8:
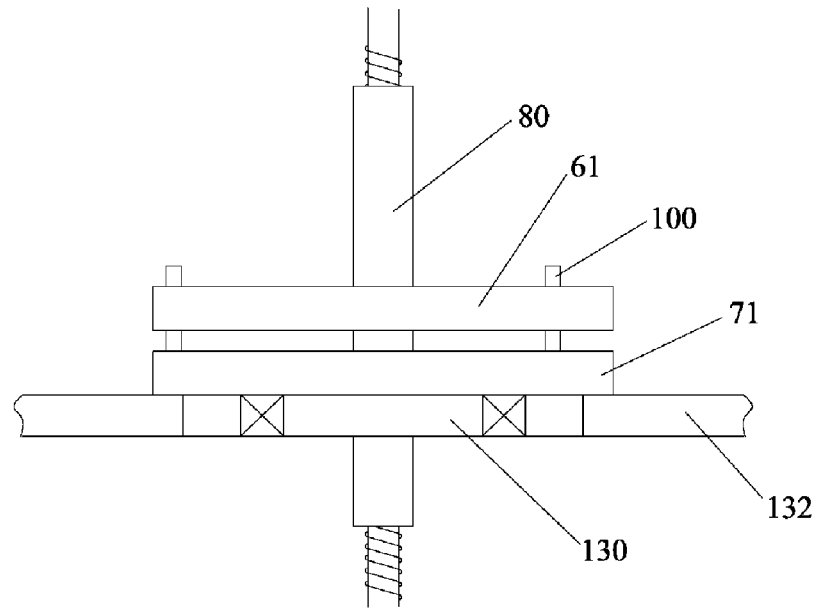
FIG. 8 is a schematic diagram of the transmission portion of the wave power generating device in accordance with another embodiment of the invention.
Figure 9:
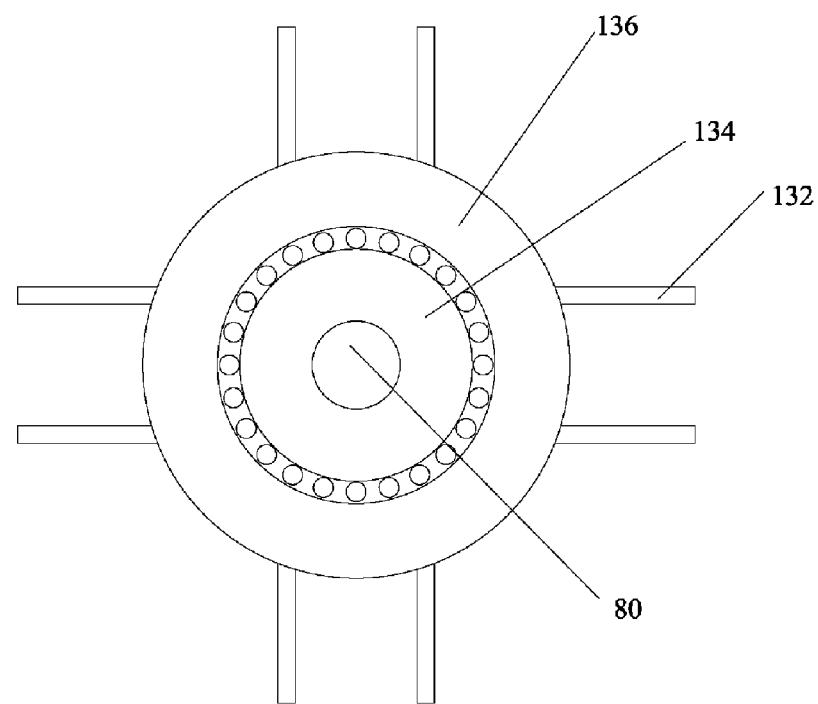
FIG. 9 is a schematic diagram of the rolling bearing with a #-shaped bracket as shown in FIG. 8.

As shown in FIG. 2, the sleeve 80 equips with two ratchet wheel mechanisms, i.e. the first ratchet wheel 70 below and the second ratchet wheel 60 above. As shown in combination with FIG. 5, the first ratchet wheel mechanism 70 comprises a first inner wheel and a first outer wheel. The first inner wheel includes a plurality of pawls 73, each formed by a spring and a lock core positioned in the spring. As shown in FIG. 5, there are 8 pawls, but it is not a limit to the present invention, and 4 pawls as shown in FIG. 7 is also an alternative. The first inner wheel comprising a plurality of pawls is fixed to the sleeve 80 directly and rotates with the sleeve 80. As shown in Figures, a plurality of ratchets 72 engaged with the pawls are formed in the inner circumference of the first outer wheel 71. When the first inner wheel rotates counterclockwise with the sleeve 80, each pawl 73 contacts against the end surface of the corresponding ratchet 72 and drives the first outer wheel 71 to rotate together, this state is called "Real Gear"; when the first inner wheel rotates clockwise with the sleeve 80, each pawl 73 contracts back under the function of the spring, and the first outer wheel 71 continues rotating clockwise under the effect of gravity, this state is called "Empty Gear". So, whatever the ocean waves rise or fall, the first outer wheel 71 of the first ratchet wheel mechanism 70 always rotates counterclockwise, driving the generator to generate power. Further, the first outer wheel 71 also comprises an annular rack rail 75 along the edge of its top surface. The annular rack rail is utilized to realize a mutual traction between the two ratchet wheel mechanisms, the specific description of which will be further explained hereafter. In a embodiment of the invention as shown in FIG. 8, the first outer wheel 71 of the first ratchet wheel mechanism 70 may be supported by a rolling bearing 130 with a #-shaped bracket 132. Specifically as shown in FIG. 9, a inner ring 134 of the rolling bearing 130 is fixed on the sleeve 80, and a outer ring 136 of the rolling bearing 130 together with the #-shaped bracket 132 are utilized to support the first outer wheel 71, thus the first outer wheel may rotate freely.

Figure 4:
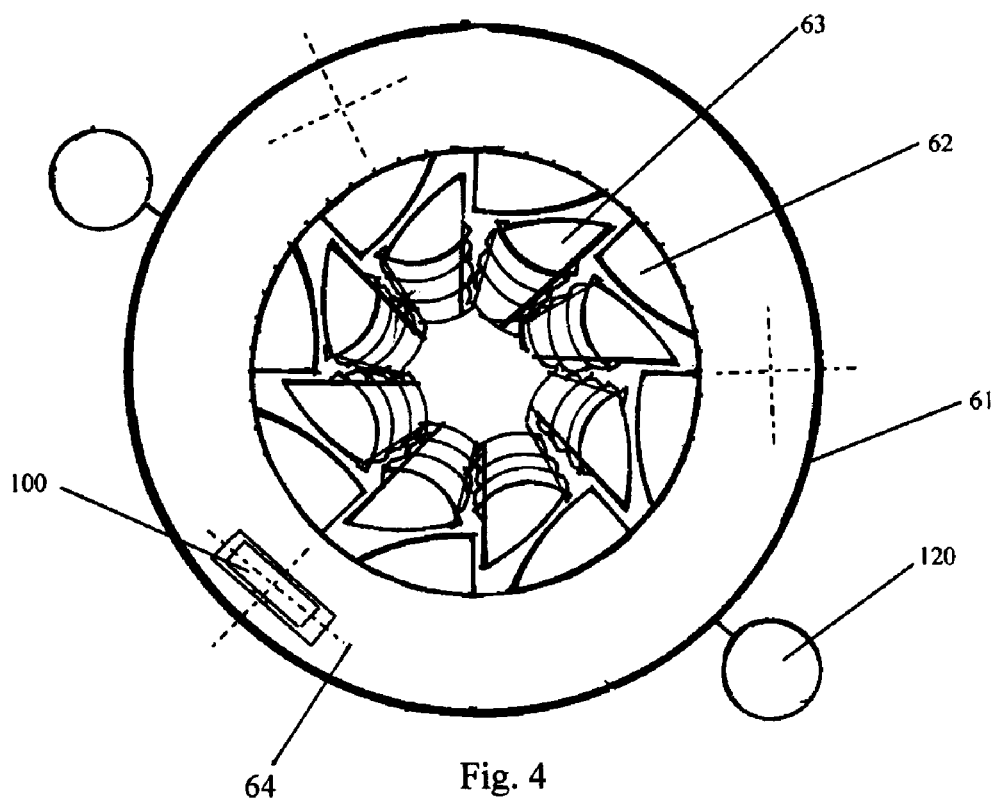
FIG. 4 is a schematic diagram of the second group of ratchet wheel mechanism of the wave power generating device in accordance with one embodiment of the invention.
Figure 6:
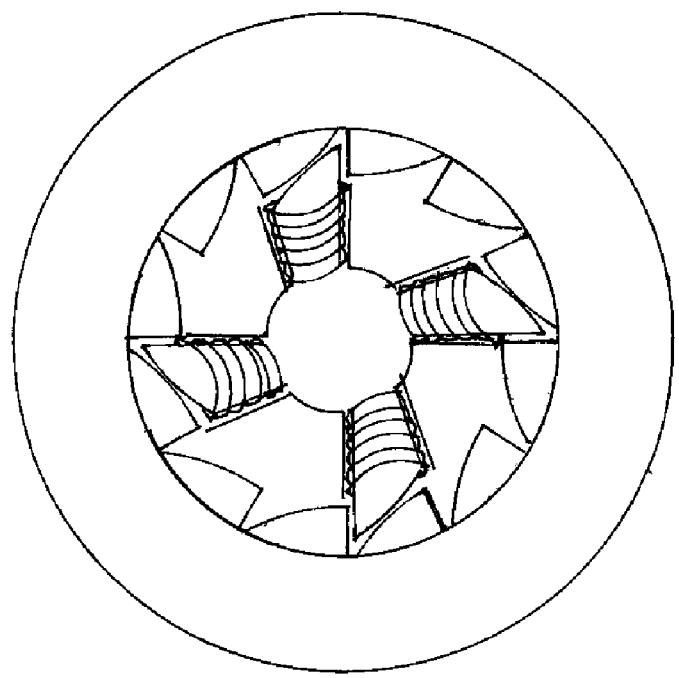
FIG. 6 is a schematic diagram illustrating engagement between the pawls and the ratchets of the second group of ratchet wheel mechanism in accordance with another embodiment of the invention.

The structure of the second ratchet wheel mechanism 60 is shown in FIG. 2 and FIG. 4, comprising a second inner wheel and a second outer wheel. The structure of the second inner wheel is similar to the first inner wheel, also comprising a plurality of pawls, fixed on the sleeve 80 and rotating with the sleeve 80. As shown in FIG. 4, 8 pawls are provided for the second inner wheel, but this is not a limit to the invention, 4 pawls as shown in FIG. 6 is also an alternative. The structure of the second outer wheel 61 is similar to that of the first outer wheel 71, wherein a plurality of ratchets 62 corresponding to the pawls 63 are formed on the inner circumference of the second outer wheel. When the second inner wheel rotates clockwise with the sleeve 80, each pawl 63 contacts against the end surface of the corresponding ratchet 62 and drives the second outer wheel 61 to rotate together, this state is called "Real Gear"; when the second inner wheel rotates counterclockwise with the sleeve 80, the pawl 63 contracts back, and the second outer wheel 61 continues rotating clockwise under the effect of gravity, this state is called "Empty Gear". So, whatever the ocean waves rise and fall, the second outer wheel 61 of the second ratchet wheel mechanism 60 always rotates clockwise, driving the generator to generate power.

Additionally, as shown in FIG. 2, the second outer wheel 61 also equips with a traction gear 100, preferably 3 traction gears evenly distributed along the circumference (other two traction gears are not shown in the figures), individually engaged with a corresponding annular rack rail 75 on the first outer wheel 71. These three traction gears 100 are perpendicular to the end surface of the second outer wheel 61, each are positioned in a corresponding through groove 64 distributed every 120 degree along the circumference of the second outer wheel 61 by a pin shaft, and can rotate about the pin shaft. The bottom portion of the traction gears 100 get through the second outer wheel 61 and then engage with the annular rack rail 75 provided along the external circumference of the first outer wheel 71. In such a way, the second outer wheel 61 is supported above the first outer wheel 71 and also a mutual traction between the two outer wheels is realized. For example, When the first outer wheel 71 rotates counterclockwise, the second outer wheel 61 rotates clockwise through the mutual action between the traction gears 100 and the rack rail 75; in the same way, when the second outer wheel 61 rotates clockwise, the first outer wheel 71 rotates counterclockwise through the mutual action between the traction gears 100 and the rack rail 75. In such a way, during the whole process of the floating platform 10 and the lifting pillar 90 rising and falling driven by the ocean waves, the first outer wheel 71 and the second outer wheel 61 are ensured to rotate continuously without any stop, driving the corresponding generators 40 and 30 to generate power continuously, thus the energy from the rises and falls of the ocean waves are substantially utilized.

Further, two or more centrifugal hammers 120 are respectively attached on the external circumferences of the first outer wheel 71 and the second outer wheel 61 along their radial direction. Because of the traction of the centrifugal hammers 120, the centrifugal force is increased, and then the rotation force and rotation speed of the two outer wheels are increased, accordingly increasing the power of the two generators driven by the belt 110. In order to prevent the second outer wheel 61 of the ratchet wheel mechanism flying away from the upside during the rotation process, a fixing ring (not shown in the figure) may be attached on the sleeve 80 above the second ratchet wheel mechanism 60, to prevent the second outer wheel 61 flying away during the rotation process. The fixing ring may be implemented in various manners.

Further explanation to the transmission process of the wave generating power device in accordance with one embodiment of the invention is provided below. As shown in FIG. 2, when the sleeve 80 rotates counterclockwise driven by the rises of the lifting pillar 90 with the ocean waves, the first ratchet wheel mechanism 70 is on "Real Gear", wherein the first outer wheel 71 rotates counterclockwise driven by the pawls, then driving the first generator 40 to generate power; simultaneously, the second ratchet wheel mechanism 60 is on "Empty Gear", wherein the second inner wheel rotates counterclockwise with the sleeve 80, while the second outer wheel 61 continues rotating clockwise under the action of the traction gears 100 and the centrifugal hammers 120, then driving the second generator 30 to generate power. When the sleeve 80 rotates clockwise driven by the falls of the lifting pillar 90 with the ocean waves, the second ratchet wheel mechanism 60 is on "Real Gear", wherein the second outer wheel 61 rotates clockwise driven by the pawls, then driving the second generator 30 to generate power; simultaneously, the first ratchet wheel mechanism 70 is on "Empty Gear", wherein the first inner wheel rotates clockwise with the sleeve 80, while the first outer wheel 71 continues rotating counterclockwise under the action of the traction gears 100 and the centrifugal hammers 120, then driving the second generator 30 to generate power. Thus in the whole process of rises and downs of ocean waves, the first outer wheel 71 always rotates counterclockwise, driving the first generator 40 continuously generating power, and the second outer wheel 61 always rotates clockwise, driving the second generator 30 continuously generating power.

According to the surface area of the floating platform over the sea, several sets of the above-mentioned wave power generating device may be installed on the floating platform, therefore sufficient power energy is generated for various use. For example, the power energy generated by the wave power generating device can be used for thermal power plant, which is enough for power supply of a city.

Claims:

1. A wave power generating device, comprising a lifting pillar (90) installed on a floating platform (10), a sleeve (80) covered outside said lifting pillar (90), a first and second ratchet wheel mechanisms installed on said sleeve (80); wherein a external circumference of said lifting pillar (90) is engaged with a inner circumference of said sleeve (80) via screw threads, thereby said sleeve (80) rotates along a first direction or a second direction with the rises and falls of the lifting pillar (90); the first or second ratchet wheel mechanisms comprises an inner wheel with multiple pawls and an outer wheel with corresponding multiple ratchets on its inner circumference, the inner wheel of the first or second ratchet wheel mechanisms is fixed on said sleeve (80) and rotates with the sleeve (80), the outer wheel of the first or second ratchet wheel mechanisms drives a corresponding power generator to generate power; the pawls and the ratchets of the first ratchet wheel mechanisms are engaged with each other to make the outer wheel (71) and inner wheel of the first ratchet wheel mechanism rotating together along the first direction when the lifting pillar (90) is rising, the pawls and the ratchets of the second ratchet wheel mechanisms are engaged with each other to make the outer wheel (61) and inner wheel of the second ratchet wheel mechanism rotating along the second direction when the lifting pillar (90) is falling.

2. The wave power generating device according to claim 1, wherein three traction gears (100) are installed on the second outer wheel (61) of said second ratchet wheel mechanism (60), engaged with a corresponding annular rack rail (75) provided on the first outer wheel (71) of said first ratchet wheel mechanism (70).

3. The wave power generating device according to claim 2, wherein each of said traction gears (100) is perpendicular to the second outer wheel (61), and positioned inside a corresponding through groove (64) on the second outer wheel (61) by a pin shaft, engaged with the annular rack rail (75) on said first outer wheel (71).

4. The wave power generating device according to claim 2, wherein the first outer wheel (71) of said first ratchet wheel mechanism (70) is supported by a rolling bearing (130) with a #-shaped bracket (132) attached on the sleeve (80), and the second outer wheel (61) of said second ratchet wheel mechanism (60) is supported on the first outer wheel (71) by the traction gears (100).

5. The wave power generating device according to claim 1, wherein the first outer wheel (71) of said first ratchet wheel mechanism (70) and the second outer wheel (61) of the second ratchet wheel mechanism (60) are respectively equipped with two or more centrifugal hammers (120) along a radial direction on their external circumferences.

6. The wave power generating device according to claim 1, wherein the screw threads on the external circumference of said lifting pillar (90) is formed by an I-shaped steel rail (91) wound regularly around the lifting pillar (90), and a corresponding spiral groove (81) for receiving the steel rail is provided on the inner circumference of said sleeve (80).

7. The wave power generating device according to claim 1, wherein said first or second inner wheel includes 8 pawls matching with the corresponding ratchets on the first or second outer wheel.

8. The wave power generating device according to claim 1, wherein said first or second inner wheel includes 4 pawls matching with the corresponding ratchets on the first or second outer wheel.

9. The wave power generating device according to claim 1, wherein each of said pawls includes a spring fixed on the first or second inner wheel and a lock core in the spring.

10. The wave power generating device according to claim 1, wherein a wind power generator (50) is attached to a bracket (20) of said floating platform (10).

* * * * *